J. BROUGHTON.
Globe-Valves.

No. 157,117. Patented Nov. 24, 1874.

Witnesses
Chas H. Smith
Geo. T. Pinckney

Inventor
John Broughton
per Lemuel W. Serrell
atty

UNITED STATES PATENT OFFICE.

JOHN BROUGHTON, OF BROOKLYN, NEW YORK, ASSIGNOR TO ADAM CARR, OF PATERSON, NEW JERSEY.

IMPROVEMENT IN GLOBE-VALVES.

Specification forming part of Letters Patent No. 157,117, dated November 24, 1874; application filed October 17, 1874.

*To all whom it may concern:*

Be it known that I, JOHN BROUGHTON, of Brooklyn, in the county of Kings and State of New York, have invented an Improvement in Globe-Valves, of which the following is a specification:

Globe-valves frequently require to be ground into the seat to prevent leakage, and in some cases the nut has been movable, so as to throw it out of action when the stem and valve are being rotated in grinding the valve to its seat.

My improvement relates to a nut made with wings that enters a similarly-shaped recess in the cap of the valve, and is held there by a movable collar that is clamped to place by the movable cap, so that, by removing the cap and taking away the collar, the nut can be run down the valve-stem, and the cap replaced upon the body of the cock, and the valve and nut rotate together as the stem is revolved in grinding the valve to its seat.

Figure 1:
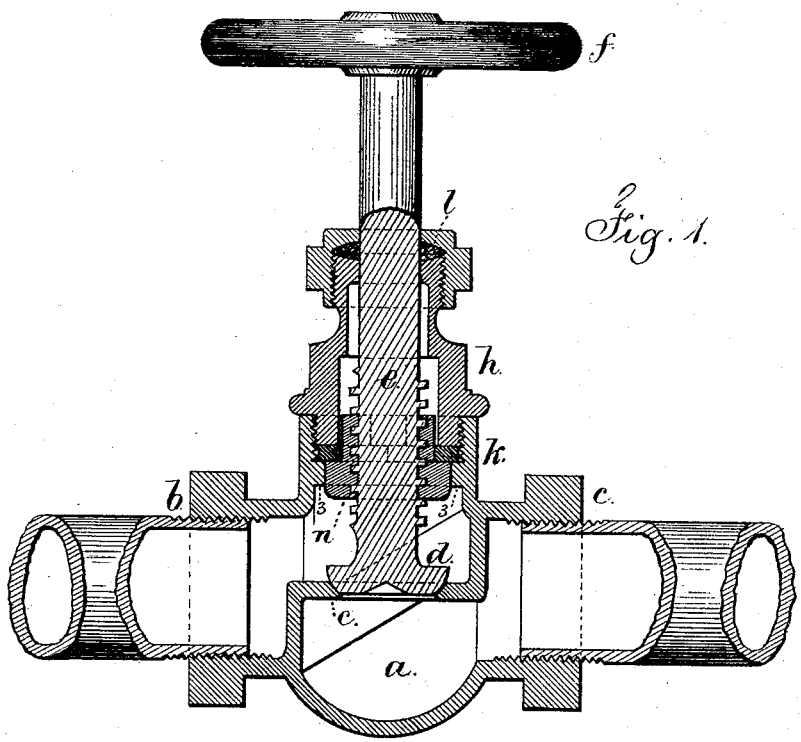
Figure 3:
Figure 4:
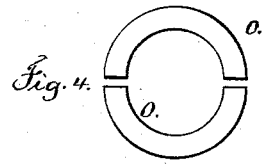
Figure 2:
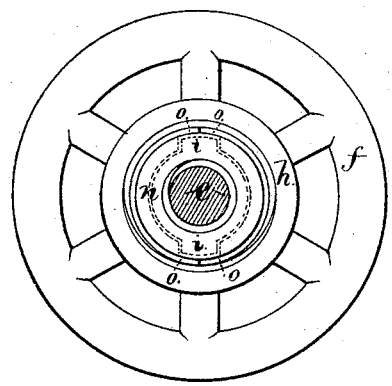

In the drawing, Figure 1 is a vertical section of the globe-valve with my improvement. Fig. 2 is an inverted plan of the nut and cap. Fig. 3 is an elevation of the nut detached; and Fig. 4 is a plan of the collar.

The body $a$, couplings $b$, seat $c$, valve $d$, stem $e$, and hand-wheel $f$ are of the usual character. The cap $h$ screws into the socket $k$ of the body $a$, and said cap is provided with a packing-gland at $l$. The nut $n$ is made separate from the cap $h$, and there are one or more projections or wings, $i\ i$, at the sides of this nut, and in the cap there is a cavity of a shape to receive and hold this nut with its wings. The nut and its wings are of a size to pass freely through the socket $k$. Hence the nut can be run down upon the screw-valve stem $e$, to near the valve $d$, and the parts inserted into the body $a$, and the valve can be rotated and ground to its seat; but when the collar or segments $o$ are put into the neck $r$ that is formed around the nut, said nut will be supported upon the ledge 3 in the socket $k$, and hence will be held up within the cap $h$, and firmly clamped thereby, so that it cannot move while the screw-stem is turned within that nut in raising the valve or pressing it to the seat.

The nut may be made with projections upon it, resting upon the ledge 3; but in that case said ledge will have to be removed at places, so as to allow the projections to pass down below the ledge when the valve is being ground to its seat.

I claim as my invention—

1. The nut $n$, provided with wings or projections $i$ entering into a cavity in the cap $h$, in combination with the valve $d$, stem $e$, seat $c$, and body $a$, substantially as specified, so that the nut is held by said cap when in use, but may be screwed down on the valve-stem below the cap when the valve is being ground to its seat, substantially as set forth.

2. The nut made with wings $i$ and a neck, $r$, in combination with the movable collar or segments $o$, the cap $h$, and the internally-flanged socket $k$ of the globe-valve, substantially as set forth.

Signed by me this 10th day of October, 1874.

JOHN BROUGHTON.

Witnesses:
GEO. T. PINCKNEY,
CHAS. H. SMITH.